United States Patent [19]
Loudenslager

[11] Patent Number: 5,828,545
[45] Date of Patent: Oct. 27, 1998

[54] COMPUTER TOWER UNIT WITH EXTERNAL SUPPORT WELLS FOR PORTABLE MEDIA STORAGE DEVICES

[75] Inventor: John H. Loudenslager, Phoenix, Ariz.

[73] Assignee: Compaq Computer Corporation, Houston, Tex.

[21] Appl. No.: 845,966

[22] Filed: Apr. 30, 1997

[51] Int. Cl.$^6$ .................................. G06F 1/16; H05K 5/02
[52] U.S. Cl. ........................ 361/683; 312/223.2; 211/40
[58] Field of Search ................................ 312/223.2, 280, 312/8.1, 8.12; 211/40, 41.12; 364/708.1; 361/683, 737

[56] References Cited

U.S. PATENT DOCUMENTS

| | | | |
|---|---|---|---|
| 1,239,063 | 9/1917 | Tompkins, Jr. ........................ | 211/40 X |
| 4,781,292 | 11/1988 | Sacherman et al. ................... | 211/40 X |
| 5,184,282 | 2/1993 | Kaneda et al. ........................... | 361/737 |
| 5,289,925 | 3/1994 | Newmark ................................. | 211/40 |

*Primary Examiner*—Michael W. Phillips
*Attorney, Agent, or Firm*—Konneker & Smith

[57] ABSTRACT

A tower type CPU unit portion of a computer system has a housing with a top side wall in which a spaced series of parallel, elongated support wells are formed. The wells are sized and configured to removably receive relatively small lower edge portions of portable media storage devices, such as compact discs in their protective cases, and support the devices in generally upright positions atop the CPU unit. When the CPU unit is positioned on the floor to one side of the desk upon which the balance of the computer system is placed, the compact discs are conveniently stored in an easily seen, readily accessible and otherwise unused location without requiring a space-consuming storage area on the desktop work area.

23 Claims, 1 Drawing Sheet

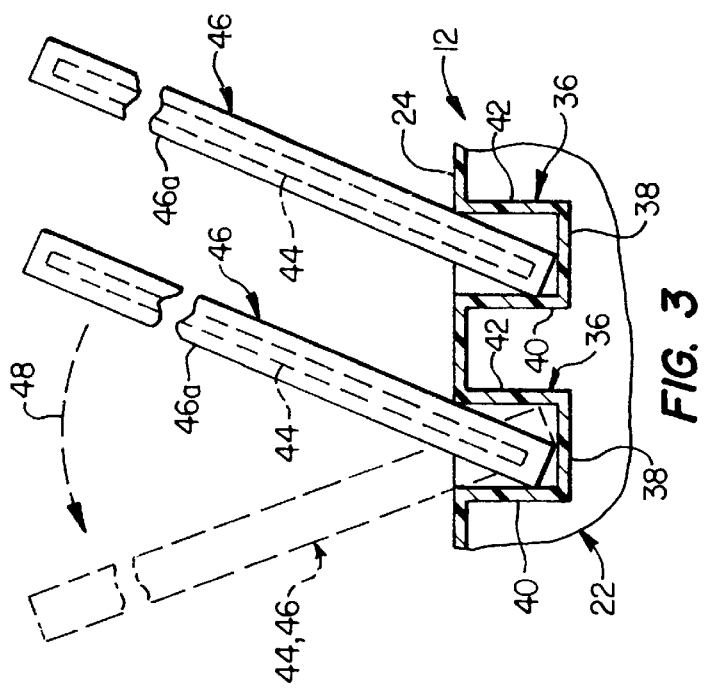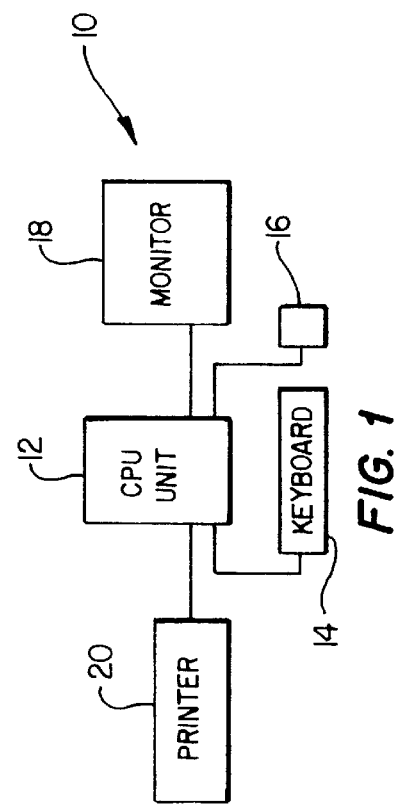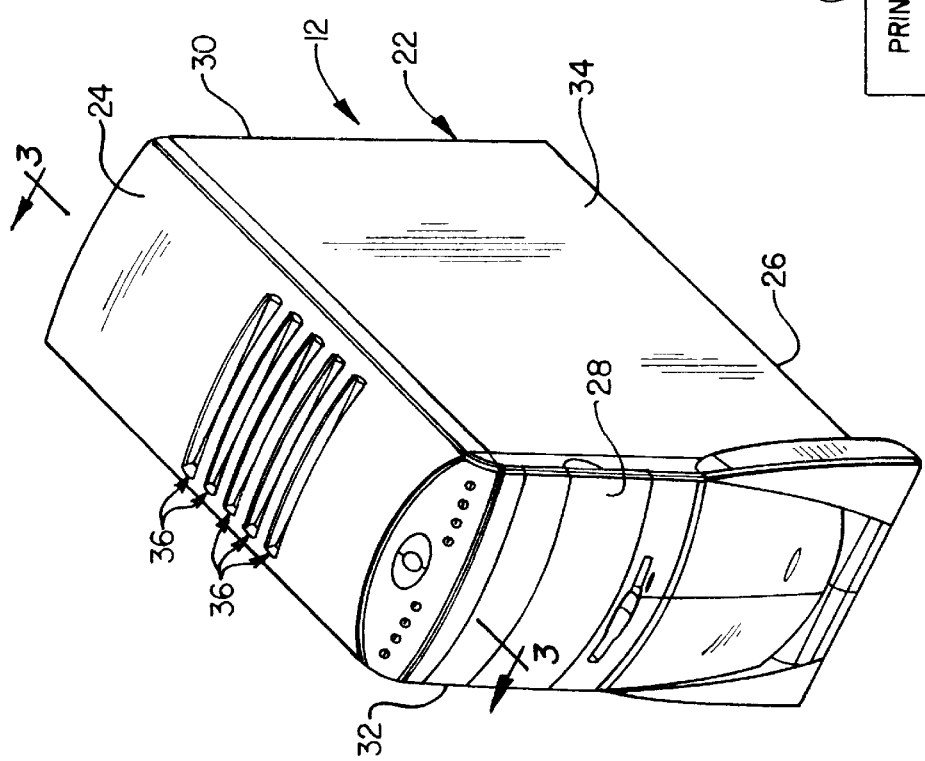

COMPUTER TOWER UNIT WITH EXTERNAL SUPPORT WELLS FOR PORTABLE MEDIA STORAGE DEVICES

BACKGROUND OF THE INVENTION

1. Field of the Invention

The present invention generally relates to computer apparatus and, in a preferred embodiment thereof, more particularly relates to the storage of computer-useable portable media storage devices, such as compact discs, zip drives, floppy discs and the like, when not in use.

2. Description of Related Art

Modern desktop computing systems typically comprise a CPU unit (the computer proper), a monitor, a keyboard, a pointing device such as a mouse, and a printer. When, as is conventionally done, all of this equipment is placed on the desktop a considerable amount of workspace thereon is consumed by the computer equipment and its related paraphernalia such as cables, speakers, accessory palm rests, paper and envelope bins, reference books and the like.

One development in computer construction that has tended to reduce the computer component area required on a desktop work space area is the provision of the CPU unit in a "tower" configuration which facilitates its convenient placement on the floor next to the desk to thus free up additional work space on the desktop.

Because of the recent trend toward multimedia computing, and the proliferation of various types of computer-useable portable media storage devices such as (in addition to the usual floppy discs) compact discs, zip drives, backup tape cartridges and the like, at least a substantial portion of this freed-up desktop space is often needed for various containers to hold media storage devices in a readily accessible location. It would thus be desirable to provide an alternate storage location for computer-useable portable media storage devices which maintains the devices in a convenient, readily accessible position yet does not require any additional desktop space.

SUMMARY OF THE INVENTION

In carrying out principles of the present invention, in accordance with a preferred embodiment thereof, a computer system component, representatively a tower type CPU unit, has a spaced plurality of external support well structures carried by an exterior wall section of its housing portion. These external support well structures are utilized to removably support a plurality of generally flatly configured portable media storage devices such as, for example, compact discs in their protective cases, zip drives, floppy discs, backup tape cartridges and the like. In this manner the usual need to house the media storage devices in a separate container that takes up desktop work space is advantageously eliminated. Instead, the devices are stored on a computer component, for ready accessibility and use, without dedicating any desktop space to the storage devices.

Each external well structure, which is representatively formed integrally with a top side wall portion of the CPU tower unit housing, and projects into the interior of the housing, is preferably configured to receive only a relatively small lower edge portion of a portable media storage device in a manner supporting the device in a generally upright orientation, permitting the supported device to be removed from the support well structure for subsequent use remote therefrom, and permitting the supported device to be vertically tilted in opposite directions relative to the housing to facilitate user location of the particular supported device required.

While the external support wells are preferably formed on the top side wall of the computer system component, they could also be formed on an exterior vertical side wall portion of the component housing if desired. In a preferred embodiment of the external support wells, each well is configured to receive only a portion of a portable media storage device in a manner nonoperatively supporting the device, precluding its further insertion into the support well structure, and isolating the portable media storage device from the interior of the computer component housing.

BRIEF DESCRIPTION OF THE DRAWINGS

FIG. 1 is a highly schematic block diagram of a representative computer system incorporating therein a specially designed tower type CPU unit embodying principles of the present invention;

FIG. 2 is a perspective view of the CPU unit; and

FIG. 3 is an enlarged scale cross-sectional view, taken generally along line 3—3 of FIG. 2, through the CPU unit and illustrating two exterior top side support well portions of the unit representatively receiving lower edge portions of a pair of compact disc storage cases.

DETAILED DESCRIPTION

Schematically illustrated in FIG. 1 is a representative computer system 10 that includes a specially designed tower type CPU unit 12 embodying principles of the present invention, and a keyboard 14, mouse 16, monitor 18 and printer 20 operatively connected as shown to the CPU unit 12.

CPU unit 12 is perspectively illustrated in FIG. 2 and includes a generally rectangular exterior housing 22 adapted to contain a CPU unit and having top and bottom walls 24 and 26, front and rear end walls 28 and 30, and left and right side walls 32 and 34. The top housing wall 24 is representatively of a molded plastic construction and, according to a key feature of the present invention, has formed therein a spaced plurality of depressions defining support wells 36. While five support wells 36 are representatively illustrated, it will be readily appreciated that a greater or lesser number could be provided on the top housing wall 24 if necessary or desirable. Additionally, while the support wells 36 are representatively illustrated as being integral portions of the top housing wall 24 (see FIG. 3 in this regard), they could be separate components if desired.

With reference now to FIGS. 2 and 3, in the illustrated preferred embodiment of the CPU unit 12, the support wells 36 representatively have elongated rectangular configurations, and are in a parallel, laterally facing array with their lengths extending transversely to the opposite left and right side walls 32,34 of the housing 22 and the wells 36 being mutually spaced apart from one another in a front-to-rear direction relative to the housing 22. As best illustrated in FIG. 3, each of the support wells 36 has a bottom or inner side wall 38, and spaced apart front and rear vertical side wall portions 40 and 42.

As will now be described, the wells 36 are used to support on the top side of the tower type CPU unit 12 a correspondingly spaced series of computer-useable portable media storage devices, such as compact discs, zip drives, floppy discs or other similar media storage devices having generally flat configurations, in generally upright orientations.

FIG. 3 cross-sectionally illustrates two of the wells 36 being used to support in this manner a pair of compact discs 44 (shown in phantom) within their relatively thin rectangular protective plastic storage cases 46, the disc/case structures 44,46 being shown in a vertically foreshortened fashion. As can be seen, each of the two illustrated wells 36 removably receives a relatively small lower side edge portion of its associated media storage device 44,46 in a manner supporting the device in a generally upright but somewhat tilted orientation. The representative portable media storage devices 44,46 are representatively illustrated in rearwardly inclined orientations in FIG. 3, with the devices sloping rearwardly and upwardly relative to the top housing wall 24 and having major portions thereof disposed externally of the housing 22.

With the media storage devices in these orientations, the front or "label" sides 46*a* of the compact disc storage cases 46 face forwardly so as to be readily seen by a computer user positioned forwardly and above the CPU unit 12. As can be seen in FIG. 3, the front-to-rear width of each support well 36 is greater than the thickness of the compact disc storage cases 46. This configurational aspect of the wells 36 permits each rearwardly successive media storage device 44,46 to be tilted forwardly in a rolodex fashion (as indicated by the dashed line arrow 48 in FIG. 3) to its dotted line position to thereby further expose the case label side 46*a* of the compact disc immediately behind it.

It can readily be seen that by placing the illustrated compact disc/storage case structures 44,46 in the wells 36 in this manner they are conveniently supported by the CPU unit in a nonoperational manner (as opposed to being operationally inserted into the CPU unit for use) on the top side of the CPU unit housing 22 where they are readily visible and accessible by the computer user and do not require any storage space on the desktop work surface area. This is true whether the CPU unit 12 is placed on the desktop or on the floor beside or under the desk.

As illustrated in FIG. 3, a lower side edge portion of each of the well-supported media storage devices 44,46 downwardly engages and rests upon the bottom wall 38 of its associated well 36, with the bottom wall 38 preventing further movement of the device into the interior of the housing 22, and opposite front and rear interior side portions of the well automatically limiting the front or rear tilt angle of the removably supported media storage device. When it is desired to use one of the compact discs 44 its readily visible storage case 46 is simply lifted out of its associated housing support well 36 and opened, and the compact disc is pushed into its insertion opening in the CPU unit 12.

While the dimensions, configurations and spacing of the wells 36 may be varied as desired, the illustrated wells 36 preferably, but by way of representation and example only, have lengths of approximately 6.5 inches, front-to-rear widths of approximately 0.6 inches, and maximum vertical depths of approximately 0.75 inches. Additionally, the front-to-rear spacing interval between each adjacent well pair is approximately equal to the front-to-rear width of the wells. This preferred dimensioning permits a wide variety of generally flatly configured portable media storage devices to be conveniently supported in the wells 36 in tilted, but generally upright orientations with only relatively small lower edge portions of the media storage devices being actually received in the support wells 36. Such portable media storage devices representatively include, in addition to the illustrated jacketed compact discs, zip drives, floppy discs, tape backup cartridges and the like.

While it is preferable that the support wells 36 be disposed on the top housing side wall 24 of the CPU unit 12, they could alternatively be located on one of the vertical side walls of the housing 22, such as the left side wall 32 or the right side wall 34. In this instance it would be desirable to incline the wells downwardly and inwardly relative to the vertical housing side wall to prevent the media storage devices from falling out of the wells, and to maintain the well-supported media storage devices in tilted but generally upright orientations.

Also, while the wells 36 have been representatively illustrated as being incorporated in the exterior housing of a CPU unit, illustratively of a tower type construction, it will be readily be appreciated that they could alternatively be incorporated in the exterior housing portion of another type of computer system component if desired.

The foregoing detailed description is to be clearly understood as being given by way of illustration and example only, the spirit and scope of the present invention being limited solely by the appended claims.

What is claimed is:

1. A computer system component comprising:
   a housing adapted to contain a CPU and having an exterior wall section and at least one external support well structure carried by said exterior wall section, each external support well structure being recessed from said exterior wall section into the interior of said housing and opening outwardly through said exterior wall section, configured to receive an edge portion of a portable media storage device in a manner supporting the device in a generally upright orientation and permitting the supported device to be removed from the support well structure for subsequent use remote therefrom, and being useable to support the device only in a nonoperative manner.

2. The computer system component of claim 1 wherein said computer system component is a CPU unit.

3. The computer system component of claim 2 wherein said CPU unit is a tower type CPU unit.

4. The computer system component of claim 1 wherein said exterior wall section is a top exterior wall section of said housing.

5. The computer system component of claim 1 wherein each external support well structure is an integral portion of said exterior wall section.

6. The computer system component of claim 5 wherein said exterior wall section is formed of a molded plastic material, and each external support well structure is molded integrally with said exterior wall section.

7. The computer system component of claim 1 wherein each external support well structure is configured to downwardly receive only a relatively small lower edge portion of its associated portable media storage device.

8. The computer system component of claim 1 wherein each external support well structure is configured to permit its supported portable media storage device to be vertically tilted in opposite directions relative to said housing.

9. The computer system component of claim 1 wherein said at least one external support well structure is a mutually spaced plurality of external support well structures.

10. A computer system component comprising:
    a housing adapted to contain a CPU and having an exterior wall section; and
    at least one external support well structure carried by said exterior wall section and being entirely recessed therefrom into the interior of said housing and opening outwardly through said exterior wall section, each external support well structure being configured to receive only a relatively small edge portion of a portable media storage device in a manner supporting the device only in a nonoperative orientation, precluding its further insertion into the support well structure and isolating it from the interior of said housing, and permitting the supported device to be removed from the external support well structure for subsequent use remote therefrom.

11. The computer system component of claim 10 wherein said computer system component is a CPU unit.

12. The computer system component of claim 11 wherein said CPU unit is a tower type CPU unit.

13. The computer system component of claim 10 wherein said exterior wall section is a top exterior wall section of said housing.

14. The computer system component of claim 10 wherein each external support well structure is an integral portion of said exterior wall section.

15. The computer system component of claim 14 wherein said exterior wall section is formed of a molded plastic material, and each external support well structure is molded integrally with said exterior wall section.

16. The computer system component of claim 10 wherein said at least one external support well structure is a mutually spaced plurality of external support well structures.

17. A computer CPU tower unit comprising:

a housing adapted to contain a CPU and having a top side wall; and a series of mutually spaced indentations formed in said top side wall, each indentation opening outwardly through said top side wall, being recessed into the interior of said housing and having a bottom side wall, and being configured to downwardly receive a lower edge portion of a portable media storage device in a manner supporting the device in a generally upright but vertically tilted orientation, support the lower edge portion upon said bottom side wall in only a nonoperative orientation, and permit the device to be removed from the indentation for subsequent use remote therefrom.

18. The computer CPU tower unit of claim 17 wherein said top side wall is formed from a molded plastic material, and said indentations are molded integrally with said top side wall.

19. The computer CPU tower unit of claim 17 wherein said indentations have horizontally elongated configurations and are arranged in a mutually parallel, laterally facing array.

20. The computer CPU tower unit of claim 17 wherein each indentation is configured to permit the portable media storage device which it supports to be vertically tilted in opposite directions relative to said housing.

21. A computer system comprising:

a CPU unit including a housing having an exterior wall section and at least one external support well structure carried by said exterior wall section, each external support well structure being recessed from said exterior wall section into the interior of said housing and opening outwardly through said exterior wall section, configured to receive an edge portion of a portable media storage device in a manner supporting the device in a generally upright orientation and permitting the supported device to be removed from the support well structure for subsequent use remote therefrom, and being useable to support the device only in a nonoperative manner;

a monitor operatively connectable to said CPU unit; and a keyboard operatively connectable to said CPU unit.

22. A computer system comprising:

a CPU unit including a housing having an exterior wall section and at least one external support well structure carried by said exterior wall section and being entirely recessed therefrom into the interior of said housing, each external support well structure being configured to receive only a relatively small edge portion of a portable media storage device in a manner supporting the device only in a nonoperative orientation, precluding its further insertion into the support well structure and isolating it from the interior of said housing, and permitting the supported device to be removed from the external support well structure for subsequent use remote therefrom;

a monitor operatively connectable to said CPU unit; and a keyboard operatively connectable to said CPU unit.

23. A computer system comprising:

a tower type CPU unit including a housing having a top side wall and a spaced series of indentations formed in said top side wall, each indentation opening outwardly through said top side wall, being recessed into the interior of said housing and having a bottom side wall, and being configured to downwardly receive a lower edge portion of a portable media storage device in a manner supporting the device in a generally upright but vertically tilted orientation, support the lower edge portion upon said bottom side wall in only a nonoperative orientation, and permit the device to be removed from the indentation for subsequent use remote therefrom.

\* \* \* \* \*

UNITED STATES PATENT AND TRADEMARK OFFICE
CERTIFICATE OF CORRECTION

PATENT NO. : 5,828,545

DATED : October 27, 1998

INVENTOR(S) : John H. Loudenslager, et al

It is certified that error appears in the above-identified patent and that said Letters Patent is hereby corrected as shown below:

On the Title Page, Item [75] Inventors, should read ---John H. Loudenslager, Phoenix, Ariz. and James S. Couch, Powell, Ohio -----

Signed and Sealed this

Third Day of April, 2001

*Attest:*

NICHOLAS P. GODICI

*Attesting Officer*  Acting Director of the United States Patent and Trademark Office